Oct. 31, 1967  A. K. SCHOTT  3,350,088
WORKPIECE POSITIONING MECHANISM FOR A MACHINE TOOL
Filed June 25, 1965  5 Sheets-Sheet 1

INVENTOR.
ARTHUR K. SCHOTT
BY *Hill, Sherman, Meroni, Gross & Simpson* ATTORNEYS

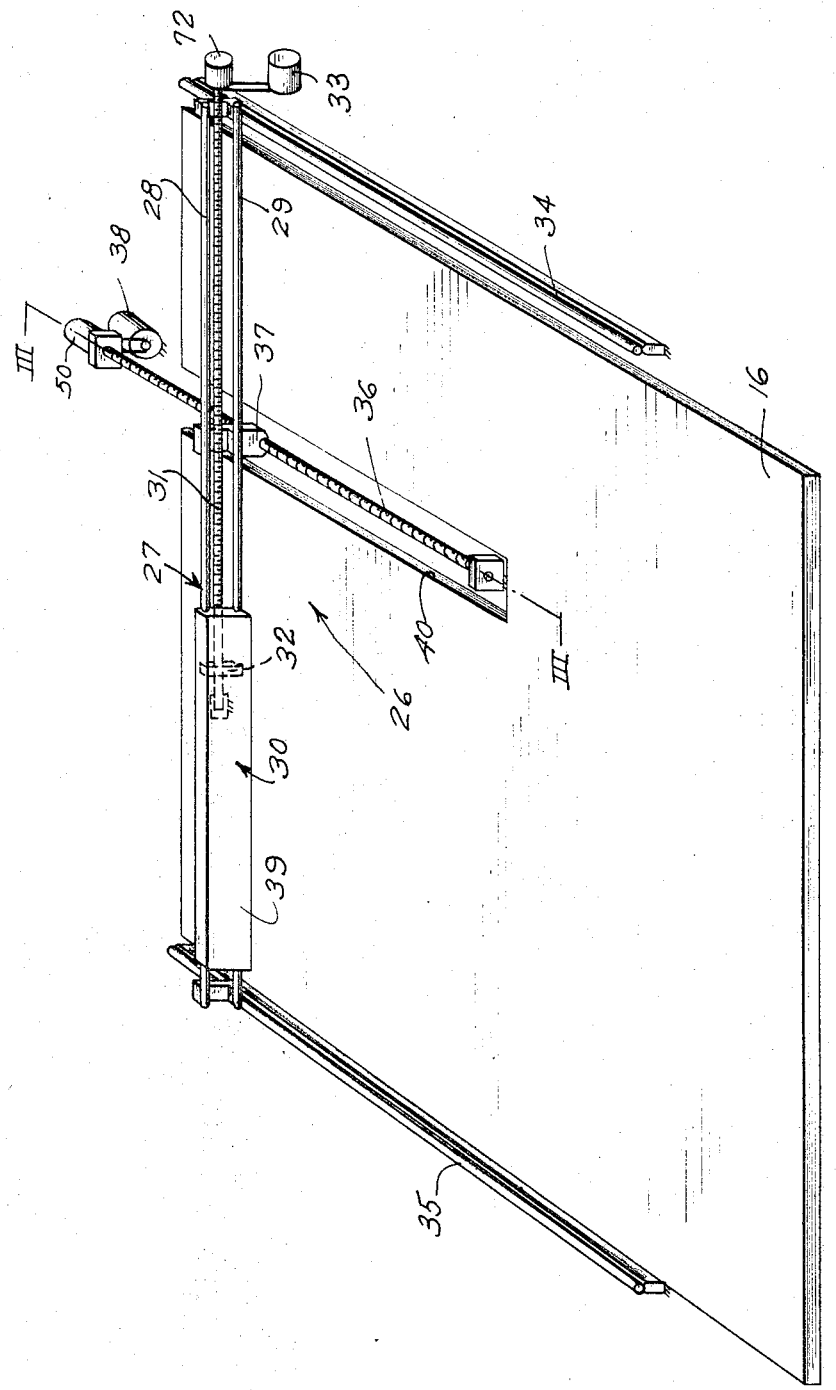

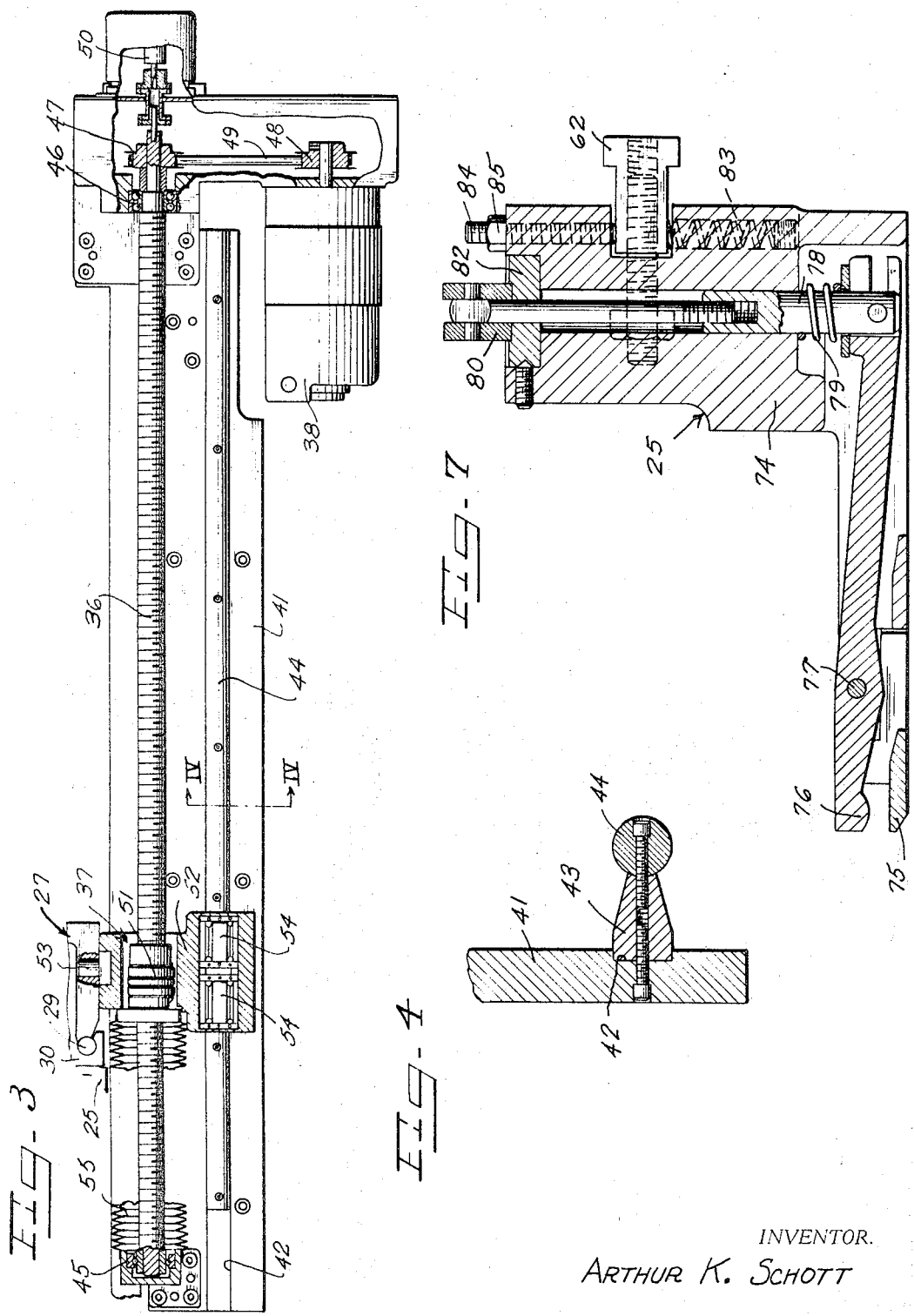

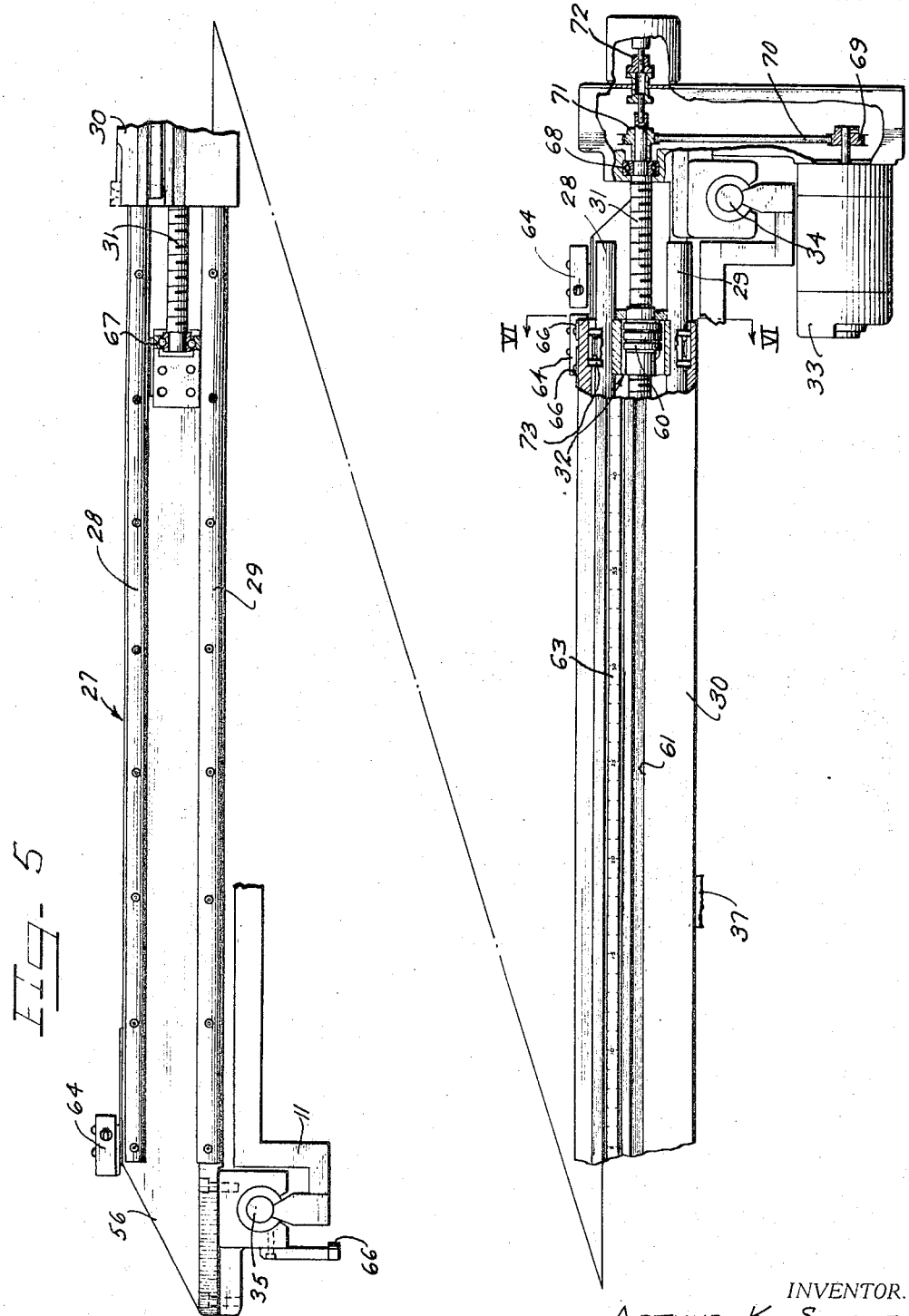

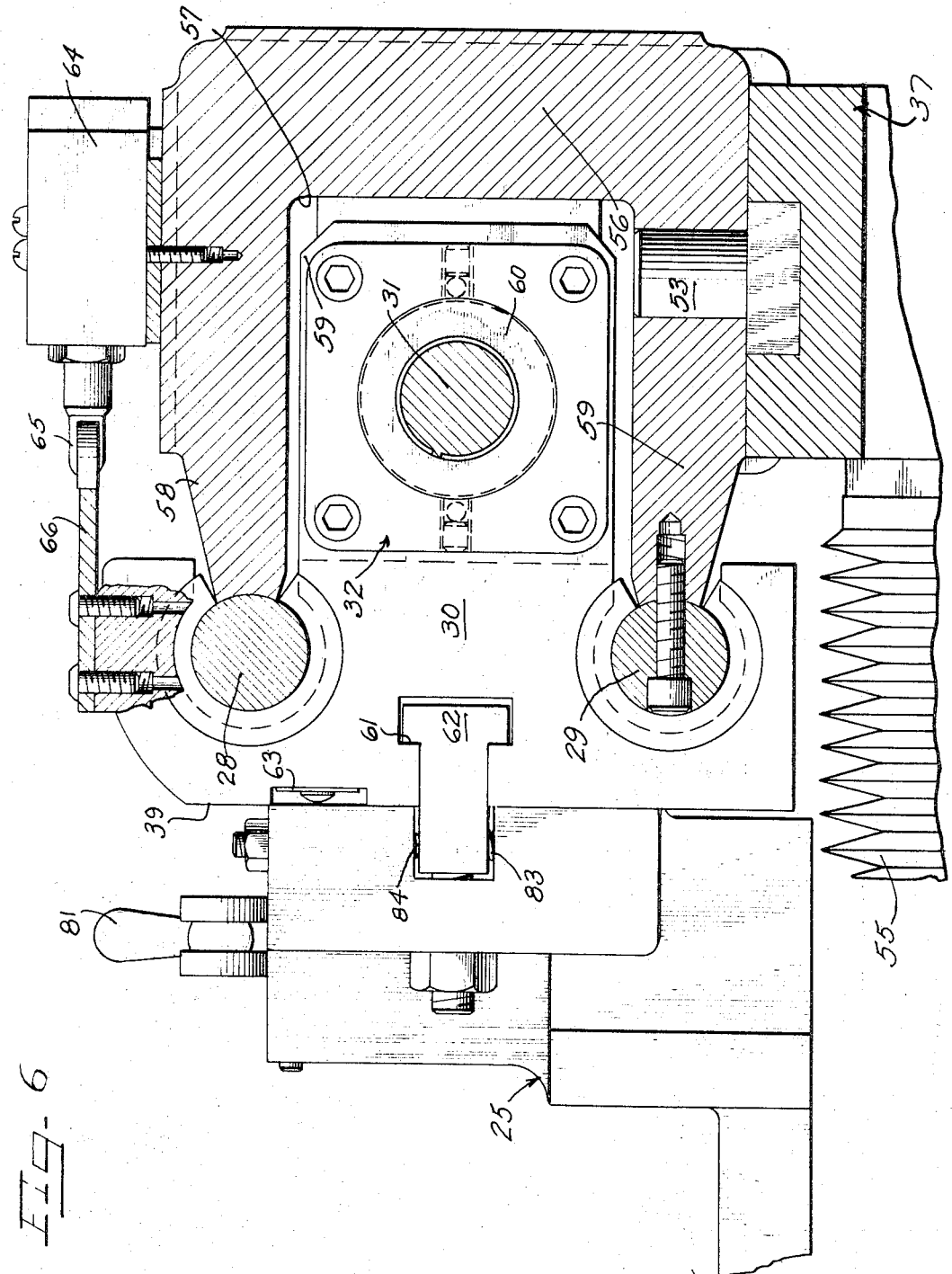

United States Patent Office 3,350,088
Patented Oct. 31, 1967

3,350,088
WORKPIECE POSITIONING MECHANISM FOR A MACHINE TOOL
Arthur K. Schott, Clarence, N.Y., assignor to Houdaille Industries, Inc., Buffalo, N.Y., a corporation of Michigan
Filed June 25, 1965, Ser. No. 467,030
7 Claims. (Cl. 269—60)

This invention relates generally to machine tools, and more particularly to a workpiece positioning mechanism which is particularly adapted to move a workpiece in two axes to various positions so as to be operated on by a punching machine, the punching machine and the motors of the positioning mechanism being under the control of a numerical control device.

Although the principles of the present invention may be included in various machine tools, a particularly useful application is made in a punching machine constructed to work on a sheet stock. Various punching machines have been provided heretofore wherein the workpiece is positioned in various places manually, either without guidance, guided by gauging, or guided by a template follower system. In a more sophisticated type of machine tool, the workpiece is moved about by a workpiece positioning mechanism under the control of a tape controlled system.

In machines of this type, it is considered essential that the positioning mechanism not obstruct access to the tooling so that the same may be conveniently changed. Therefore, it is necessary that such mechanism extend through the throat of the press frame. Accordingly, the throat size must be sufficiently large to accommodate not only the workpiece, but to accommodate such positioning mechanism.

In accordance with the present invention, there is provided a workpiece positioning mechanism wherein that portion of the mechanism which extends through the throat of the press is unusually short in the direction in which the throat opens, namely in the direction of the length of the throat. The necessary drive mechanisms for this element are located outside of the throat, and yet the portion of the throat occupied by such positioning mechanism is unusually small.

Accordingly, it is an object of the present invention to provide an improved workpiece positioning mechanism for a machine tool, which mechanism is particularly advantageous for use with a numerical control device.

A further object of the present invention is to provide a workpiece positioning mechanism wherein very little of the effective throat size of the machine is occupied by such positioning mechanism.

Many other features, advantages, and additional objects of the present invention will become manifest to those versed in the art upon making reference to the detailed description and the accompanying sheets of drawings in which a preferred structural embodiment incorporating the principles of the present invention is shown by way of illustrative example.

*On the drawings*

FIG. 2 is a schematic view showing the general organization of the positioning mechanism, the elements thereof appearing in perspective;

FIG. 3 is a side elevational view, partly in cross section and partly broken away, and taken along a line on the punching machine represented by the line III—III on the schematic illustration of FIG. 2;

FIG. 4 is an enlarged cross-sectional view of a fragmentary portion of the positioning mechanism, taken along line IV—IV of FIG. 3;

FIG. 5 is a front elevational view, partly broken away, of the workpiece positioning mechanism;

FIG. 6 is an enlarged cross-sectional view taken along line VI—VI of FIG. 5; and FIG. 7 is a cross-sectional view of a workpiece clamp as shown in elevation in FIG. 6, and carried by the positioning mechanism.

*As shown on the drawings*

Figure 1:
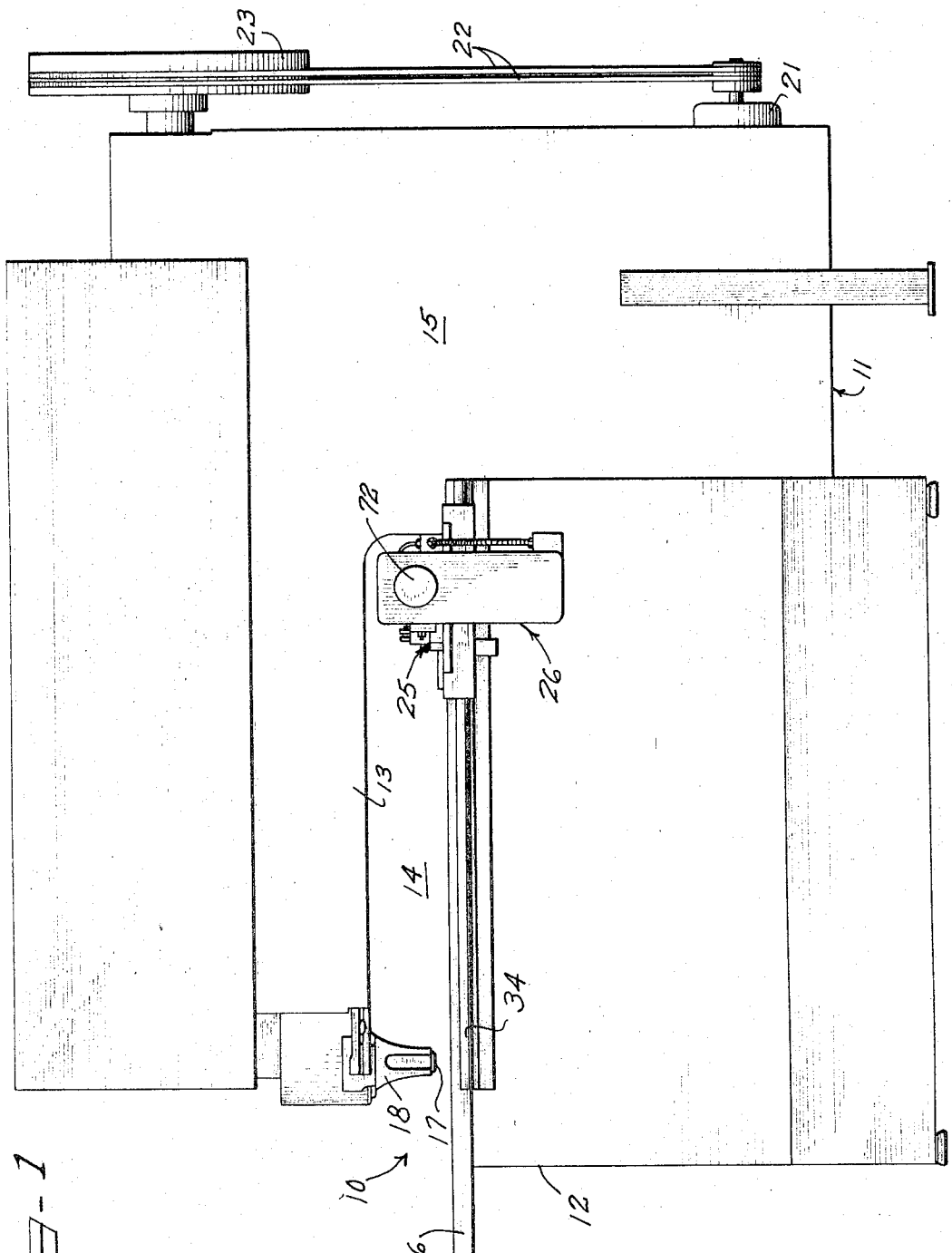
FIG. 1 is a side elevational view of a numerically controllable punching machine having a workpiece positioning mechanism provided in accordance with the principles of the present invention.

The principles of this invention are particularly useful when embodied in a machine tool such as a punching machine, illustrated and generally indicated in FIG. 1 by the numeral 10. The machine tool 10 includes a generally C-shaped frame 11 having a lower arm 12 and an upper arm 13 vertically spaced therefrom so as to define a laterally opening C-shaped configuration. The frame 11 has a laterally opening throat 14, the open end of which constitutes the front of the machine, and the throat being open at its sides. Frame 11 further includes a vertical portion 15 which joins together the spaced upper and lower arms 13, 12, and a workpiece-supporting table 16 and is disposed within the throat 14 and extends laterally therefrom, both in a forward direction, to the left, and to the right. A portion of the table 16 extends beyond opposite sides of the vertical portion 15 of the frame 11. The lower arm 12 supports a die (not shown) and the upper portion or upper arm 13 supports a reciprocable punch 17 for cooperation with the die, the punch being carried within a punch holder 18, and vertically reciprocated by means not shown. A motor 21 acts through a pair of belts 22 to drive a pulley 23 connected to an eccentric for reciprocating the punch 17. From time to time, as may be desired, the punch 17 and the die are changed in accordance with work requirements.

A workpiece is normally disposed within the throat 14 between the punch and die means, and is held by a workpiece clamp 25, shown in greater detail in FIGS. 6 and 7. The workpiece clamp 25 is secured to a workpiece positioning mechanism generally indicated at 26, the same being more fully illustrated in FIGS. 2–6.

The workpiece positioning mechanism 26 includes an elongated horizontally extending rail assembly 27. The rail assembly 27 includes a pair of vertically spaced rails 28, 29, a workpiece holder 30 supported by the rails 28, 29 for movement along the length of the rails, a first rotatably supported screw 31 which extends parallel to the rails 28, 29 which is disposed at a height vertically intermediate the rails 28, 29, and which has a driving connection 32 with the workpiece holder 30. A first reversible motor 33 is drivingly connected to the screw 31 to rotate it in either direction, and hence to reciprocate the workpiece holder 30 along the rails 28, 29.

The elongated rail assembly 27 is supported for horizontal movement in a direction perpendicular to its length, such support being provided by a further pair of rails 34, 35 carried by the frame 11. To provide such movement, a second horizontal screw 36 is rotatably supported on the frame 11, and has a driving connection 37 with the rail assembly 27. A second reversible motor 38 is drivingly connected to the screw 36 to rotate it, and hence to reciprocate the rail assembly 27 on the stationary rails 34, 35. The workpiece holder 30 has a front face 39 adapted as described below for supporting a workpiece. The workpiece holder 30 has its maximum cross-sectional transverse dimension extending in a vertical direction, and hence the workpiece holder has its maximum rigidity in a vertical plane, thereby minimizing deflection thereof in a vertical direction.

The table 16 has an elongated slot 40 through which the driving connection 37 projects, the screw 36 being disposed therebeneath within the frame. The slot 40 may lie at either side of the vertical portion 15 of the frame 11, or may be centrally located so that all of the components associated therewith are completely enclosed by the frame 11. The structure associated with the motor-driven screw 36 and the driving connection 37 is shown in FIG. 3.

The frame 11 includes a vertical wall 41 having a groove 42 within which there is disposed a number of stand-off members or spacers 43 which support a still further rail 44, also referred to herein as a third rail.

The screw 36 is supported at its ends by a pair of bearings 45, 46 carried by the frame, the screw 36 having a pulley 47 driven by the motor 38 through a pulley 48 and a belt 49. A sensing element 50 is corotatably connected to the shaft 36 for transmitting suitable signals to the tape controlled mechanism.

The connection 37 between the screw 36 and the rail assembly 27 includes a conventional ball nut 51 supported by a casing 52 and driven by the threads of the screw 36. The casing 52 has an upwardly projecting pin 53 received in a suitable opening in the rail assembly 27. The casing 52 includes a pair of conventional ball bushings 54, 54 by which the connection means 37 is supported on the third rail 44, and by which the forces on the screw means 36 are minimized. A shield 55 of bellows form is provided to protect the screw 36.

As seen in FIG. 5, the elongated horizontally extending rail assembly 27 includes a channel member 56 supported at its ends on the side rails 34, 35. As best seen in FIG. 6, the channel member 56 includes a horizontally opening channel 57 to define a horizontally opening C-shaped cross section, the upper arm 58 of which supports the rail 28, and the lower arm 59 of which supports the lower rail 29. The connection 32 between the workpiece holder 30 and the screw 31 includes a rearwardly projecting ear 59 within which there is disposed a conventional ball nut assembly 60, carried by such extension 59 and coacting with the threads of the screw 31. The front face 39 of the workpiece holder 30 has a vertical extent which is at least as great as the vertical spacing between the rails 28, 29, such face being adapted to hold the workpiece clamp 25. Such adaptation in this embodiment is provided by a T-shaped slot 61 receptive of a T-shaped clamping block 62 carried by the workpiece clamp 25. The front face 39 of the workpiece holder 30 is also provided with a calibrated scale 63 disposed in recessed relation. The channel member 56 supports a number of limit switches 64 having plungers 65 engaged by appropriately positioned cams 66 carried on the workpiece holder 30.

The screw 31 is rotatably supported at its ends by a pair of bearings 67, 68 carried by the channel member 56, the screw 31 being rotatably driven by the motor 33 acting through a pulley 69, a belt 70 and a pulley 71. The screw 31 is also corotatably connected to a suitable follow-up or sensing device 72 for indicating its position to the tape controlled means. The workpiece holder 30 is provided with a number of ball bushings 73 by which it is supported on the rails 28, 29.

The workpiece clamp 25 shown in FIG. 7 includes a housing 74 having a stationary finger 75 and a centrally pivoted finger 76 between which fingers 75, 76 the workpiece is received. The finger 76 is pivoted about a pin 77 by means of a vertical plunger 78 having a pin and slot connection therewith. The finger 76 is biased to an open position by a spring 79 acting between it and the housing 74. An eccentric or cam 80 having a handle 81 shown in FIG. 6 bearing against a wearplate 82 and adjustably connected to the plunger 78 can be rotated to close and open the gap between the fingers 75 and 76. The T-shaped clamping blocks 62, one on each side of the housing 74, are provided with suitable clearance so that the clamping means 25 may be adjusted vertically by a slight amount with respect thereto. To this end, a further spring 83 acts between the housing 74 and the block 62, while a screw 84 having a jam nut 85 may be positioned to raise and lower the housing 74 with respect to the respective block 62.

The motor 38 thus drives the rail assembly 27 in a direction perpendicular to its length to move the workpiece carried by the workpiece holder 30 to a position sensed by the means 50, while the motor 33 moves the workpiece holder to a position along the length of the vertically spaced rails 28, 29 to a position sensed by the means 72. The vertical alignment and spacing of the rails 28, 29 enables the use of a relatively heavy and massive channel member 56 and a relatively heavy or massive workpiece holder 30 for relatively heavy duty work, while such components occupy a minimum amount of the throat 14 of the machine tool 10.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A workpiece positioning mechanism for a machine tool, comprising in combination:
   (a) an elongated horizontal-extending rail assembly supported for horizontal movement in a direction perpendicular to its length, said rail assembly including
      (1) a pair of parallel vertically spaced rails,
      (2) a workpiece holder supported by said rails for movement therealong,
      (3) a first rotatably supported screw extending parallel to said rails, having a driving connection with said workpiece holder, and being disposed on said rail assembly at a height vertically intermediate said rails, and
      (4) a first reversible motor drivingly connected to said first screw to rotate it;
   (b) a second rotatably supported horizontal screw extending perpendicularly to said rail assembly, and having a driving connection therewith to move it horizontally in a direction perpendicular to said rail assembly; and
   (c) a second reversible motor drivingly connected to said second screw to rotate it.

2. A workpiece positioning mechanism in a machine tool having spaced upper and lower arms joined together by a vertical portion so as to define a frame with a C-shaped configuration having a laterally opening throat, comprising in combination therewith:
   (a) a pair of parallel vertically spaced rails disposed in and horizontally extending through said throat;
   (b) a workpiece holder supported by said rails for movement therealong;
   (c) a first rotatably-supported motor-driven screw extending parallel to and disposed between said rails, and having a driving connection with said workpiece holder; and
   (d) a second horizontal rotatably-supported motor-driven screw carried by said frame, extending in a direction perpendicular to said rails, and having a driving connection with said rails.

3. A workpiece positioning mechanism for a machine tool, comprising in combination:
   (a) a fixed frame;
   (b) a pair of parallel vertically spaced rails extending horizontally above a portion of said frame and means movably supporting said rails thereon for horizontal movement in a direction perpendicular to said rails;
   (c) a workpiece holder supported by said rails for movement therealong;
   (d) a first rotatably-supported motor-driven screw movable with said vertically spaced rails, said screw extending parallel to and disposed between said rails, and having a driving connection with said workpiece holder;

(e) a third horizontal rail fixedly disposed within said portion of said frame and extending parallel to said rail-supporting means;
(f) a second horizontal rotatably-supported motor-driven screw carried by said frame, and extending parallel to said third rail; and
(g) means providing a driving connection between said second screw and said vertically spaced rails, and supported by said third rail.

4. A workpiece positioning mechanism for a machine tool, comprising in combination:
(a) a fixed frame;
(b) a pair of parallel vertically spaced rails extending horizontally above a portion of said frame and movably supported thereon for horizontal movement in a direction perpendicular to said rails;
(c) a workpiece holder supported by said rails for movement therealong, said holder having a front face extending vertically for a distance at least as great as the vertical spacing between said rails, and adapted to support workpiece clamping means;
(d) a first rotatably-supported motor-driven screw movable with said vertically spaced rails, said screw extending parallel to and disposed between said rails, and having a driving connection with said workpiece holder; and
(e) a second horizontal rotatably-supported motor-driven screw carried by said frame, extending in a direction perpendicular to said rails, and having a driving connection with said rails.

5. A workpiece positioning mechanism for a machine tool, comprising in combination:
(a) a fixed frame;
(b) an elongated horizontally-extending member supported at its ends on said frame for horizontal movement in a direction perpendicular to its length, said member having a horizontally opening channel extending along its length;
(c) a pair of rails supported in vertically spaced parallel relation to each other by said channel member at opposite sides of said channel;
(d) a workpiece holder supported by said rails for movement therealong;
(e) a first motor-driven screw disposed in said channel and rotatably supported by said channel member;
(f) means connected to said workpiece holder and disposed in said channel, and providing a driving connection with said screw; and
(g) a second horizontal rotatably-supported motor-driven screw carried by said frame, extending in a direction perpendicular to said rails, and having a driving connection with said channel member.

6. A workpiece positioning mechanism for a machine tool, comprising in combination:
(a) a pair of parallel vertically spaced rails extending horizontally and movably supported for horizontal movement in a direction perpendicular to said rails;
(b) a workpiece holder supported by said rails for movement therealong;
(c) a first rotatably-supported motor-driven screw movable with said vertically spaced rails, said screw extending parallel to and disposed between said rails, and having a driving connection with said workpiece holder; and
(d) a second horizontal rotatably-supported motor-driven screw extending in a direction perpendicular to said rails, and having a driving connection with said rails.

7. A workpiece positioning mechanism for a machine tool, comprising in combination:
(a) a fixed frame;
(b) an elongated horizontally-extending member supported at its ends on said frame for horizontal movement in a direction perpendicular to its length, said member having a horizontally opening channel extending along its length;
(c) a pair of rails supported in vertically spaced parallel relation to each other by said channel member at opposite sides of said channel;
(d) a workpiece holder supported by said rails for movement therealong, said holder having a front face extending vertically for a distance at least as great as the vertical spacing between said rails, and adapted to support workpiece clamping means;
(e) a first motor-driven screw disposed in said channel and rotatably supported by said channel member;
(f) means connected to said workpiece holder and disposed in said channel, and providing a driving connection with said screw;
(g) a third horizontal rail fixedly disposed on said frame beneath and spaced from said channel member, and extending in a direction perpendicular thereto;
(h) a second horizontal rotatably-supported motor-driven screw carried by said frame, and extending parallel to said third rail; and
(i) means providing a driving connection between said second screw and said channel member, and supported by said third rail.

References Cited
UNITED STATES PATENTS 2,958,247  11/1960  Levine _____ 83—413
3,145,605  8/1964  Langmead et al. _____ 83—413

ANDREW R. JUHASZ, *Primary Examiner.*

L. B. TAYLOR, *Assistant Examiner.*